United States Patent [19]
Pircon

[11] 4,120,670
[45] * Oct. 17, 1978

[54] POLLUTION CONTROL APPARATUS AND METHOD

[76] Inventor: Ladislav J. Pircon, 305 Canterberry La., Oak Brook, Ill. 60521

[*] Notice: The portion of the term of this patent subsequent to Dec. 10, 1991, has been disclaimed.

[21] Appl. No.: 816,677

[22] Filed: Jul. 18, 1977

Related U.S. Application Data

[63] Continuation-in-part of Ser. No. 632,648, Nov. 17, 1975, Pat. No. 4,036,609, which is a continuation-in-part of Ser. No. 252,914, May 12, 1972, Pat. No. 3,920,422, which is a continuation-in-part of Ser. No. 190,248, Oct. 18, 1971, Pat. No. 3,853,506.

[51] Int. Cl.$^2$ ............................................. B01D 47/00
[52] U.S. Cl. .................................... 55/90; 55/257 R; 55/465; 261/DIG. 54
[58] Field of Search .................... 55/1, 84, 90, 91, 93, 55/94, 240, 241, 242, 257 R, 462–465; 261/DIG. 54

[56] References Cited

U.S. PATENT DOCUMENTS

| | | | |
|---|---|---|---|
| 1,527,235 | 2/1925 | Taylor | 55/1 |
| 2,579,282 | 12/1951 | Vicard | 55/90 |
| 3,616,604 | 11/1971 | Schouw | 55/462 |
| 3,853,506 | 12/1974 | Pircon | 55/91 |
| 3,920,422 | 11/1975 | Pircon | 55/90 |
| 3,957,465 | 5/1976 | Pircon | 55/465 |
| 4,036,609 | 7/1977 | Pircon | 55/91 |

*Primary Examiner*—Bernard Nozick
*Attorney, Agent, or Firm*—Thomas W. Speckman

[57] ABSTRACT

Apparatus operating at low pressure drop and low initial velocity for removing pollutants down to sub-micron sizes from gas streams comprising a nozzle means accelerating the gas flow to about four times its entering velocity into a large expansion chamber having an impinger area for removal of pollutant. This is a method of removing pollutants down to sub-micron size at high efficiency by passing the polluted gas through a nozzle having specific geometry into an expansion chamber and impinging the pollutants upon an impinging area and removing them from the system.

15 Claims, 6 Drawing Figures

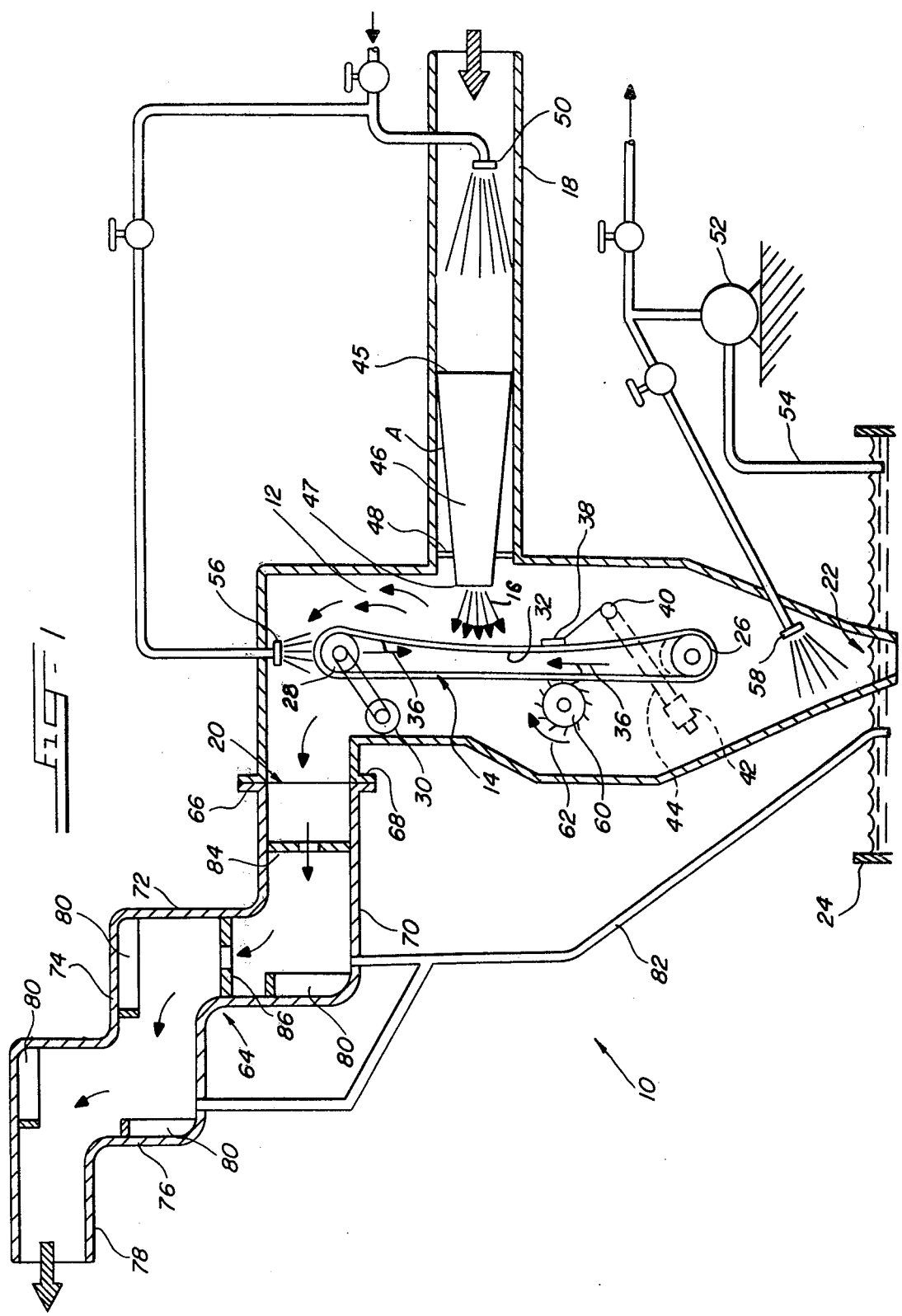

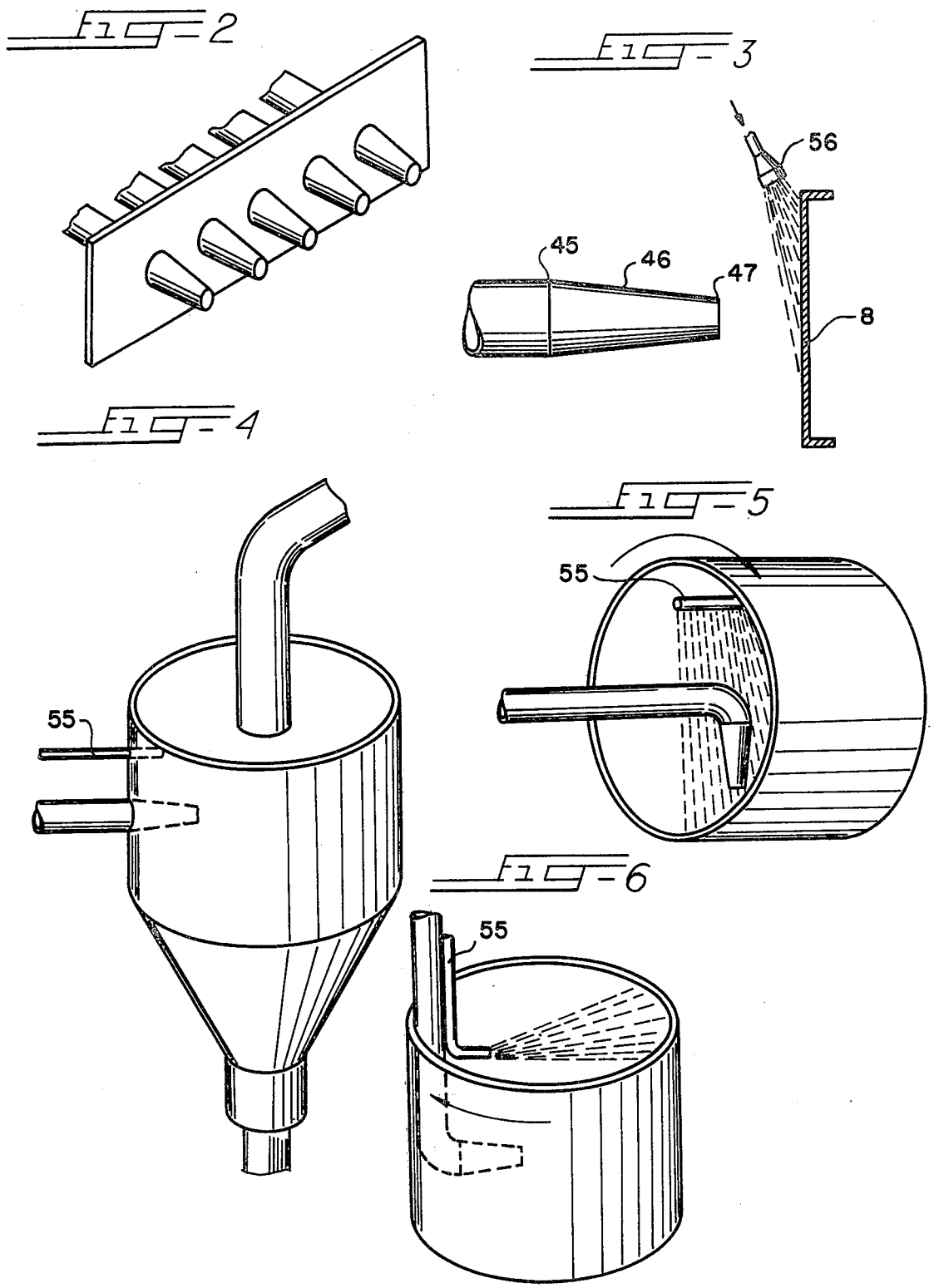

POLLUTION CONTROL APPARATUS AND METHOD

CROSS REFERENCE TO RELATED APPLICATIONS

This application is a continuation-in-part of my co-pending application, Ser. No. 632,648, filed Nov. 17, 1975, to issue as U.S. Pat. No. 4,036,609 on July 19, 1977, which application is a continuation-in-part of application Ser. No. 252,914, filed May 12, 1972, now U.S. Pat. No. 3,920,422 issued Nov. 18, 1975, which applications is a continuation-in-part of application Ser. No. 190,248, filed Oct. 18, 1971, now U.S. Pat. No. 3,853,506, issued Dec. 10, 1974.

The general concern of the public and industry alike for the quality of the environment, particularly as expressed in modern pollution control laws, has intensified the search for more efficient and more economical means for controlling industrial effluvia. Special attention has been directed to the control of the discharge of undesirable gaseous and particulate pollutants into the atmosphere.

In the past, cyclone separators and bag collectors have been commonly employed for industrial pollution control. However, conventional cyclone separators do not achieve more than a moderate degree of particulate removal and are not considered effective in controlling emissions of pulverulent particles. Bag filters are of greater efficiency, even of finely divided solids, but are encumbered with the considerable expense of bag maintenance. Bag filters also exhibit declining efficiency as the bags fill in use and are incapable of handling hygroscopic or tacky particulates.

Electrostatic precipitators have also been utilized but these present disadvantages of high power consumption, expensive maintenance, high voltage and explosion hazards, corrosion problems due to necessary materials of construction, and cannot be used with gases containing high amount of moisture.

Venturi gas scrubbers have also been used in attempts to obtain satisfactory industrial pollution control. It is generally recognized in the use of Venturi gas scrubbers that high gas flow velocities are necessary to obtain most effective gas flow results. However when the velocity through the Venturi reaches about 650 feet per second, the pressure drop through the Venturi becomes so substantial that an increase in velocity beyond that is impractical. Even at the conventional velocities used, the Venturi section introduces a large pressure drop, in the order of 15 to 30 inches of water, resulting in large power consumption to maintain flow through the cleaning apparatus. Further, as speed of flow through the Venturi apparatus is increased, the greater is the tendency for particles to disintegrate into smaller sizes, thereby increasing the small-sized particles passing out of the effluent stack.

Therefore, an object of the present invention is to provide an apparatus for removal of pollutants from a gas stream which is higly efficient and useful in a wide variety of applications.

A more general object of the invention is to provide an apparatus for removing pollutants from a gas stream which has a low pressure drop across the apparatus.

Another object of the invention is to provide an apparatus which is continuous in its operation and has a low gas velocity while removing sub-micron particles from a gas stream with high efficiency.

Still another object of the invention is to provide an apparatus which is self-cleaning and non-clogging.

An object of this invention is to provide an apparatus and method for removing noxious odors and chemically reacting particles in polluted gas streams.

Another object of the invention is to provide an apparatus and method for removing particulates from high temperature gas streams.

A further object of the invention is to provide an apparatus and method for agglomerating particles in gas streams which is efficient in both wet and dry operations.

Another object is to provide a method having high efficiency for removing pollutants down to submicron sizes from gas streams.

These and other objects and features of the invention will become more apparent from the following description and preferred embodiments.

FIG. 1 shows a diagrammatic view of one embodiment of an apparatus of this invention;

FIG. 2 shows another embodiment of an apparatus of this invention using five nozzles;

FIG. 3 shows another embodiment of an apparatus of this invention wherein the impingement surface is a fixed surface.

FIG. 4 shows a diagrammatic view of an embodiment of an apparatus of this invention wherein the nozzle is directed into a cyclone scrubber which acts as the impingement surface;

FIG. 5 shows a diagrammatic view of an embodiment of an apparatus of this invention wherein the nozzle is directed toward a drum granulator which acts as the impinging surface; and FIG. 6 shows an embodiment of an apparatus of this invention wherein the nozzle is directed into a pan granulator which acts as the impinging surface.

Referring now to FIG. 1, the apparatus of my invention for removing pollutants from stack effluvia is indicated generally by the reference numeral 10. Apparatus 10 comprises a main work vessel or expansion chamber 12 and impingement surface in the form of an endless travelling belt 14 which is fabricated from a flexible, substantially imperforate material such as imperforate metal belts, rubber belting, and tightly woven cloth fabrics. Chamber 12 is provided with holding means 48 which supports nozzle 46 in a generally horizontal position with entry 45 in communication with gas delivery conduit 18. Nozzle 46 has outlet 47 in communication with chamber 12. Chamber 12 also is arranged with gas stream outlet 20 which, in the illustrated embodiment, is located vertically above and generally horizontally opposite nozzle outlet 47. Chamber 12 has pollutant discharge opening 22 which is maintained in airtight relationship by being submerged beneath the liquid contained in holding tank 24. The liquid in tank 24 being commonly a dilute water solution of the pollutants being removed from the gas stream.

The endless travelling belt 14 is trained over a lower idler roller 26 and an upper companion roller 28 which is driven from a suitably energized motor 30, the rollers 26 and 28 being generally vertically aligned spanning nozzle outlet 47 so that portion 32 of belt 14 confronts the gas stream from the nozzle outlet in impingeable relationship with the gases passing through the nozzle. Lower idler roller 26 is free to move upward to permit desired concavity in the belt, but is retained against an upper stop to prevent undue distortion of the belt and contact with frictional wear between the opposite runs of the belt due to high velocity gas streams. Belt 14 is driven in the direction of arrows 36, running from the driven roller 28, past the impingement region and toward the roller 26, in a generally downward direction past the gas stream inlet 16. Where the collected particulates do not flake off the belt 14 on traversing the curvature of roller 26 or where maximum belt cleaning is desired, a skimmer or scraper element 38 may be disposed generally between the impingement section and roller 26 and is swingably mounted on a pivot rod 40 to be urged into cleaning contact with the surface of the travelling belt by means of a counterweight 42 which is adjustably mounted on an arm 44 in order to regulate the cleaning pressure which is applied by skimmer 38 to the surface of the belt. Scraper element 38 may be held against the surface of the belt by an suitable means, such as a spring.

Conduit 18 is connected to the exhaust from a pollution source such as a furnace, grinding, crushing, or other size reduction equipment or spray drying of milk or other such liquids, the effluent of casting operations or the like. Input conduit 18 may be connected to any pollution-containing gas source. The polluted air and/or other gases are fed into conduit 18 under a certain velocity by means of a blower or other like device, not shown, or may be sucked through the apparatus by an exhaust blower in the exhaust stack of the apparatus. In order to accelerate the polluted gas stream toward the impingement section of the travelling belt 14, nozzle 46 is mounted in the gas stream inlet of chamber 12 by means of support plate 48. Nozzle 46 will be more fully described below. It is sufficient here to say that nozzle 46 serves to agglomerate the pollutants of the gas stream.

Particulate agglomeration may be further enhanced by spraying liquid into the gas stream in advance of nozzle 46 through spray 50 situated generally in the delivery conduit 18 as shown. Liquid is forced through the spray device 50 by means of a pump. Enhanced pollution removal may also be achieved by supplying suitable quantities of liquid to the endless belt 14 in advance of the impingement section 32. Spray 56 is located to direct a spray of suitable liquid over the outer surface of belt 14 as the belt passes over the driven roller 28. The liquid in tank 24 may also serve as the supply for liquid being delivered by the spray device 56. A third spray device 58 is advantageously directed toward the pollutant discharge opening 22 in order to contact and moisten solids which have been scraped from the outer surface of the travelling belt by the skimmer 38. Pump 52 circulates liquid from tank 24 through spray 58. It is usually preferred that fresh liquid be supplied to spray 50. In many instances the liquid from tank 24 may be used in both spray devices 56 and 58, and sometimes even in spray device 50. For such modifications, the necessary piping is readily apparent.

For most applications for removing pollutants from effluent stacks, it is desirable to use fresh water in spray 50. When the effluent gas contains undesirable chemical effluents, weak solutions of a chemical may be introduced through spray 50 which chemically reacts with the undesired chemicals. For example, noxious odors may be removed by introducing weak solutions of chemicals which oxidize the odor-causing chemicals in the effluent stream. Also, undesired sulphur or nitrogen-containing compounds may be oxidized by introduction of dilute oxidizing agents such as sodium chlorate or potassium chlorate.

The apparatus of my invention also works satisfactorily in many instances without the use of any water and in such cases the pollutant discharge opening 22 is closed by a suitable mechanical device permitting solids to pass from expansion chamber 12 to a collecting chamber without release of pressure.

I have found that the linear velocity of belt 14 is not critical to the operation of the apparatus of my invention, but velocities in linear feet per minute of about 40 to 150 appear most suited. Velocities of about 50 to 90 linear feet per minute are preferred.

An auxiliary cleaning arrangement comprising a rotary brush 60 may be disposed in contact with the outer surface of the travelling belt 14 beyond the region of gas impingement in the direction of belt travel, being advantageously situated generally opposite the skimmer 38 and rotated generally into the direction of belt travel as indicated by the arrow 62.

Tower eliminator unit 64 is connected to the gas stream outlet 20 of the expansion chamber 12, the tower eliminator unit 64 providing a deflected exhaust gas pathway and being advantageously fastened to the chamber 12 by cooperating flanges 66 and 68. The tower eliminator arrangement shown is particularly adapted to remove fine droplets of liquid remaining in the gas stream together with any solids or gases trapped by such droplets. In order to reduce the velocity of these droplets so that they may become separated from the gas stream, the tower eliminator arrangement includes a first generally horizontal section 70, a subsequent, generally vertical section 72, a further horizontal section 74, a succeeding vertical section 76 and a final horizontal section 78. The several offset sections of the tower eliminator arrangement 64 provide a tortuous escape path for the exhaust gases to maximize the opportunity for mist elimination. In addition, a sequence of baffles 80 are situated in the individual eliminator sections at the respective downstream ends thereof so as to insure entrapment of liquid droplets. Gravity drains 82 are provided in the tower eliminator arrangement 64 to drain accumulated liquids from the tower eliminator to beneath the surface of the liquid in tank 24. Orifice plates 84 and 86 are provided to modify the velocity of the effluent gases.

It is apparent that any suitable device for removing undesired liquid droplets may be connected to gas stream outlet 20 of expansion chamber 12. For some applications, only one trapping section may be desired, while for other applications, it may be desired to connect gas stream outlet 20 directly to an effluent stack.

Nozzle 46 is an important feature of my invention. I have found that using the apparatus of this invention very high efficiency rates in removal of a wide variety of particle sizes in gas streams can be obtained through use of nozzles shown in FIG. 1 as 46 having gas velocities at the entry of about 15 to 175 feet per second as compared with Venturi's having 333 to 666 feet per second. The Venturi by its nature and high velocity operation requires controlled expansion after the gas passes through the throat resulting in pressure drops of 18 to 40 inches of water at the above mentioned velocities.

The apparatus of my invention has a large expansion volume into which the gas stream passes from the exit of the nozzle. The apparatus of my invention operates at about 0.4 to 8 inches of water pressure drop throughout the entire apparatus. In the apparatus of my invention it is desired that the entry velocity of the gas be low.

Usually the velocity of gases in effluent stacks is controlled by governmental codes in order to retain the particulate matter in suspension. Thus, as pointed out above, the entry velocities for gases in the apparatus of my invention may be at the low range of velocities generally permitted by governmental codes.

The gas containing particulates, according to my invention, is passed through a nozzle means such as 46 in FIG. 1 having an entry at one end portion (45) and an outlet at the other end portion (47) wherein the cross-sectional area of the entry to the nozzle is about 2 to 12 times the effective cross-sectional area of the outlet area of the nozzle. By effective cross-sectional area I mean the area at 90° to the axis of gas flow. It is preferred that the entry to the nozzle have a cross-sectional area about 3 to b 5 times the cross-sectional area of the outlet of the nozzle. The length of the converging portion of the nozzle is determined by the angle of convergence shown as A in FIG. 1. It is preferred that the mean angle of convergence be about 4° to 8°, about 5.5 to 6.5 degrees being preferred. About 6 degrees is especially preferred. By mean angle of convergence, I mean as measured on the line drawn from the entry to the outlet. It is preferred that the entry be round and the nozzle conical, but other symmetrical geometrical shapes are satisfactory. I have found it suitable for the diameter of the outlet to be about 0.5 to 0.7 times the distance from the outlet to the impingement means, about 0.6 times being preferred.

The particulate-containing gas is accelerated in nozzle 46 due to outlet 47 being of smaller cross-sectional area than entry 45. As pointed out above, the gas is accelerated to a velocity at outlet 47 of about 2 to 12 times its velocity at entry 45. Upon passing from outlet 47 to expansion chamber 12, the gas expands rapidly, thereby quickly reducing its velocity. The distance from outlet 47 to an impingement means such as belt 14 must be such that a large portion of the particulate matter in the gas reaches impingement area 34 at the much reduced gas velocity.

It is believed the high efficiency of the apparatus and process of my invention is due to the differential velocity, differential acceleration and differential deceleration of different-sized particles in the gas stream. The interplay of differing forces and different-sized particles caused by the geometry of the gas acceleration in the nozzle and decleration in the large expansion volume causes extremely high particle collision resulting in very high agglomeration, It appears that smaller submicron particles are more efficiently agglomerated by the apparatus of my invention than larger-sized particles.

Due to the extremely high efficiency of agglomeration as pointed out above, the apparatus of my invention may be operated with a wide variety of impingement means and without water sprays. In such instance, only the materials of construction are the limiting factor on the temperatures of the incoming gases. When the apparatus of my invention is operated with water spray 50, the introduced gas should be below the temperature at which the droplets will flash to steam, that is, about 212° F., unless the size of the droplet or water temperature is used to compensate for the effect of vaporization.

Multiple nozzles may be connected to a gas stream as shown diagrammatically in FIG. 2 so long as the gases from the outlets of the nozzles impinge upon a suitable impingement surface.

Suitable impingement means need not be moving belts such as shown in FIG. 1, but may comprise a wide variety of suitable surfaces as shown in FIGS. 3, 4, 5 and 6. The desirable factors for the impingement means are that of sufficient size and distance from nozzle outlet 47 to permit substantially all of the particulate matter in the gas stream passing through the expansion zone from outlet 47 to reach its surface. Distances I have found to be satisfactory have been set forth above. It is also desired, but not necessary, that the surface of the impingement means be provided with means for substantially continuously removing particulate matter from that surface. It is to be understood that impingement means includes fluid and gaseous flows which the particulate-containing gas stream may impinge upon. It is preferred that the impingement means have an imperforate surface upon which impingement takes place.

FIG. 3 shows nozzle 46 directed so that the gases and particulate matter from outlet 47 are directed to a flat impingement surface formed by plate 8. It is to be understood that spray 56 is not necessary to the functioning of the apparatus of my invention but utilization of spray 56 does increase the efficiency of removal of pollutants from the stack gas. Spray 56 may also spray the expansion zone between the nozzle outlet and the impingement means.

FIG. 4 shows an apparatus of my invention wherein the nozzle is directed to an impingement means formed by a conventional cyclonic scrubber wherein the nozzle effluent and the water are introduced tangentially therefore causing a vigorous scrubbing within the vessel. The water together with the particulate matter is removed at the bottom of the vessel while the clean gases exit from the top of the vessel. The impingement in this embodiment thus takes place on the surface of the water droplets.

FIG. 5 schematically illustrates an embodiment of my invention wherein the nozzle is directed to an impingement means comprising a standard drum granulator. In this embodiment, the impingement takes place on the sides of the drum granulator.

FIG. 6 shows an embodiment of my invention wherein the nozzle is directed toward an impingement means comprising a standard pan granulator. In this embodiment the impingement takes place on the sides of the pan granulator.

From the above, it is apparent that the impingement means may be any surface or liquid configuration located in the expansion zone at a distance from said outlet sufficient to insure impingement of substantially all particulate matter entrained in the gas stream.

While scraper, brush and water means have been described above to remove particulate matter from the impingement means and expansion zone, it is recognized that any suitable means for removal of particulate matter from the expansion zone is satisfactory.

Likewise, while various stack means including demisting configurations have been more fully described above, any suitable means for removing the clarified gas from the expansion zone is satisfactory dependent upon stack effluent requirements.

Much of the specific description of my invention has referred to removal of pollutants from gas streams. It is readily recognized that my apparatus and process is suitable for removal of any particulate matter from any gas stream under operating conditions described. While the description of my invention has referred to the particulate-containing gas stream as emanating from specific polluting apparatus, it is clear that the apparatus and process of my invention are also applicable to purifying recirculating air. In this manner pollutant-containing atmospheres may be cleaned by the apparatus and process of my invention.

The process of my invention for removing particulate matter from gas streams comprises passing said particulate-containing gas stream through the entry of a nozzle at velocities of about 15 to 175 feet per second, accelerating the gas stream through a converging portion of the nozzle to about 2 to 12 times the entrance velocity, passing the particulate-containing gas stream from the exit of the nozzle to a large expansion zone decelerating the gas, causing impingement of substantially all particulate matter entrained in the gas stream on an impingement means, removing particulate matter from the expansion zone, and removing the clarified gas stream from the expansion zone.

The following examples are intended as illustrations of various embodiments of my invention which should not be limited thereby.

EXAMPLE I

An apparatus, as shown in FIG. 1, was used to remove quarry dust from a gas stream. The apparatus used a nozzle 12 inches diameter at the input and 6 inches diameter at the exit with the angle of convergence of approximately 6 degrees as shown in the apparatus illustrated in FIG. 1. The exit of the nozzle was 10 inches from the impingement area of the belt. The dust was fed into the system, at a constant rate, by means of a screw feeder which conveyed dust from a storage hopper to a tube which discharged in the stack leading to the nozzle input. The gas containing dust was passed through the nozzle under conditions shown in Table I using the dust loading indicated. The velocity was determined by using a Dwyer Air Veklocity Meter No. 400. For determination of the dust content and particle size distribution in the gas a Monsanto Enviro-Chem's Brink BMS-11 Sampling Kit was used with a Model B Cascade Impactor having five in-line stages, each of which contained a jet that utilizes a collection cup as an impaction plate. These five cups collect particles ranging in size from 3 microns to 0.33 microns. Columnar gas separation techniques were used for ascertaining size measurement of dust feed stock replicates. The exhaust gas from the apparatus was analyzed by using the Model B Cascade Impactor in the exhaust stack. The gas entering the sampling tube was drawn through the tube at the same velocity as the gas passing the tube inlet in order to establish isokinetic conditions. After each test run, the collection cups were removed and weighed on an analytical balance to the nearest tenth of a milligram. From such measurements the weight per cent of feed solids removed was determined.

The apparatus was operated with water sprays in the amount indicated in Table I. The pressure drop across the entire apparatus was ascertained by connecting one side of a water manometer to the stack leading to the nozzle and the other side to the effluent stack from the apparatus.

Results using quarry dust are shown in Table I:

TABLE I

| | Test Groups | | | |
|---|---|---|---|---|
| | I | II | III | IV |
| Water Rate - Gallons per Hour - Total | 120 | 10.0 | 3.0 | 0 |
| Gallons per Hour - Spray in Nozzle Input | 2.5 | 3.0 | 3.0 | — |
| Pressure Drop - | | | | |

TABLE I-continued

| | Test Groups | | | |
|---|---|---|---|---|
| | I | II | III | IV |
| Inches of Water | 0.75 | 0.75 | 0.75 | 0.75 |
| Percentage Removal - Arithmetic Mean | 99.6 | 98.7 | 98.8 | 97.3 |
| Removal - Standard Deviation | 0.128 | 0.378 | 0.078 | 0.91 |
| Removal - Range Percentage | 99.4 – 99.8 | 98.2 – 99.0 | 98.8 – 99.0 | 95.7 – 98.4 |
| Average Dust Loading - Grains per Cubic Foot | 2.75 | 3.21 | 2.99 | 3.29 |
| Entry Volume in Cubic Feet per Minute | 785 | 785 | 785 | 785 |
| Belt Speed in Linear Feet per Minute | 150 | 150 | 70 | 70 |

TABLE II

SIZE DISTRIBUTION OF QUARRY DUST ADDED IN RUNS SHOWN IN TABLE I

| U.S. Standard Mesh Sieves | Percentage Retained on Screen Test Groups | | |
|---|---|---|---|
| | I & II | III | IV |
| +100 | 42.1 | 68.5 | 38.4 |
| +200 | 55.6 | 83.7 | 66.2 |
| +325 | 81.8 | 93.2 | 93.3 |
| −325 | 18.2 | 6.8 | 6.7 |

EXAMPLE II

The same apparatus as described in Example I was used for removal of fertilizer dust from air streams. The apparatus was operated under conditions set forth in Table III using fertilizer dust added as shown in Table IV, resulting in the removal shown in Table III. The water rate through the spray in the nozzle input was 0.0416 gallons per minute.

Similar results have been obtained substituting a fixed flat plate impingement surface of substantially imperformate material as shown in FIG. 3 for the moving belt impingement means. Sampling trains as prescribed by the U.S. Environmental Protection Agency Method 5 were used in conjunction with an apparatus having a fixed flat plate impingement surface for treatment of exhaust from a fertilizer granulation plant including dust from the dryer and resulted in meeting emission regulations allowing issuance of a permit in the State of Georgia.

TABLE III

| | Test Groups | | | | |
|---|---|---|---|---|---|
| | I | II | III | IV | V |
| Water Rate - Gallons per Minute - Total | 2.0 | 2.0 | 2.5 | 2.5 | 2.5 |
| Pressure Drop - Inches of Water | 0.75 | 0.75 | 1.9 | 1.9 | 1.9 |
| Average Dust Loading - Grains per Cubic Foot | 2.30 | 2.69 | 2.54 | 21.8 | 22.0 |
| Entry Volume in Cubic Feet per Minute | 785 | 785 | 1200 | 945 | 945 |
| Percentage Removal | 99.9 | 99.8 | 99.7 | 99.8 | 99.8 |
| Belt Speed in Linear Feet per Minute | 70 | 150 | 65 | 60 | 60 |

TABLE IV
SIZE DISTRIBUTION OF FERTILIZER DUST ADDED IN RUNS SHOWN IN TABLE III

| U.S. Standard Mesh Sieves | Percentage Retained on Screen Test Groups | | | |
|---|---|---|---|---|
| | I | II | III | IV & V |
| +200 | 96.0 | 2.5 | 21.3 | 79.5 |
| −200 | — | 97.5 | — | — |
| +100 | 24.7 | — | 3.8 | 63.6 |
| +325 | — | — | 49.4 | 85.1 |
| −325 | — | — | 50.6 | 14.9 |

EXAMPLE III

The same apparatus as described in Example I was used for removal of fly ash from air streams. The apparatus was operated under conditions shown in Table V with the fly ash added in the size distribution shown in Table VI. A study of the effectiveness of removal of micron and submicron particles according to operation as set forth in Table V is shown in Table VI. The water rate through the spray in the nozzle input was 0.416 gallons per minute. The belt speed was 65 linear feet per minute.

Similar results have been obtained substituting a fixed flat plate impingement surface of substantially imperforate material as shown in FIG. 3 for the moving belt impingement means. Sample trains as prescribed by the U.S. Environmental Protection Agency Method 5 were used in conjunction with an apparatus having a fixed flat plate impingement surface for treatment of boiler stack flue gas at 25,000 ACFM on a commercial installation and resulted in meeting emission regulations allowing issuance of a permit in the State of North Carolina.

TABLE V

| | |
|---|---|
| Water Rate - Gallons per Minute - Total | 2.5 |
| Pressure Drop - Inches of Water | 1.6 |
| Average Dust Loading - Grains per Cubic Foot | 2.60 |
| Entry Volume in Cubic Feet per Minute | 1020 |
| Percentage Removal | Above 99.9 |

TABLE VI
REMOVAL OF MICRON AND SUB-MICRON PARTICLES

| Size (Microns) | % Input | % Recovered |
|---|---|---|
| 3.14 | 22.9 | 99.8 |
| 1.63 | 8.3 | 99.8 |
| 1.10 | 3.7 | 99.9 |
| .57 | 1.9 | 99.9 |
| .33 | .9 | 99.9 |

96.7% of the input was less than 24 mesh size.

EXAMPLE IV

The same apparatus as described in Example I was used for removal of iron oxide from air streams. The apparatus was operated under conditions shown in Table VII with the iron oxide added in the size distribution shown in Table VIII. A study of the effectiveness of removal of micron and submicron particles according to operation as set forth in Table VII is shown in Table VIII. The water rate through the spray in the nozzle input was 0.0416 gallons per minute. The belt speed was 65 linear feet per minute.

TABLE VII

| | |
|---|---|
| Water Rate - Gallons per Minute - Total | 2.5 |
| Pressure Drop - Inches of Water | 2.0 |
| Average Dust Loading - Grains per Cubic Foot | 2.00 |
| Entry Volume in Cubic Feet per Minute | 1200 |
| Percentage Removal | 99.7 |

TABLE VIII
REMOVAL OF MICRON AND SUB-MICRON PARTICLES

| Size (Microns) | % Input | % Recovered |
|---|---|---|
| 3.14 | 2.4 | 93.1 |
| 1.63 | 2.9 | 96.2 |
| 1.10 | 13.1 | 99.7 |
| 0.57 | 25.6 | 99.8 |
| 0.33 | 20.6 | 99.8 |

100% of input was less than 40 micron size.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. A process having a pressure drop of about 0.4 to 8 inches of water for removing particulate matter from gas streams comprising passing said gas stream having particulate matter therein through the entry of a nozzle; accelerating the gas stream through a converging portion of said nozzle having a mean angle of convergence of about 4° to 8° providing outlet velocities of about 2 to 12 times the entrance velocity; passing said particulate-containing gas stream from the nozzle outlet through an expansion zone decelerating the gas, said acceleration and deceleration of the gas stream causing particulates to agglomerate; impinging said agglomerates and particulates upon a fixed flat surface of substantially imperforate material thereby separating said particulates and agglomerates from said gas stream; removing said particulates and agglomerates from the expansion zone; and separately removing clarified gas from the expansion zone.

2. The process of claim 1 wherein said gas stream is at a velocity of about 15 to 175 feet per second upon entry to said nozzle.

3. The process of claim 1 wherein said outlet velocity is about 3 to 5 times the entrance velocity.

4. The process of claim 1 wherein liquid spray is introduced to said gas stream having particulate matter therein, prior to entry of a nozzle.

5. The process of claim 1 wherein particulates and agglomerates are removed from said expansion zone by water sprays.

6. The process of claim 1 wherein said clarified gas upon removal from said expansion zone passes through a de-misting means.

7. The process of claim 1 wherein said gas stream is passed through multiple nozzles.

8. The process of claim 1 wherein said particulates are different sized particles and the acceleration and deceleration of said gas stream induces differential accelerations and differential decelerations to the different sized particles thereby inducing differential velocities of the particles causing high agglomeration of said particles.

9. The process of claim 1 wherein said nozzle outlet has a diameter about 0.5 to 0.7 times the distance from the nozzle outlet to the impingement means.

10. In an apparatus having a pressure drop about 0.4 to 8 inches of water for removing particulate matter from gas streams:

a chamber defining a gas expansion zone;

a nozzle having an entry at one end and an outlet at the other end, said entry being in communication with a gas stream having undesired particulate matter entrained therein and said outlet being in communication with said gas expansion zone, said entry having an effective cross-sectional area of about 2 to 12 times the effective cross-sectional area of said outlet and the mean angle of convergence of said nozzle means being in the range of about 4° to 8°;

impingement means comprising a fixed flat imperforate surface in said expansion zone opposite said nozzle outlet at a distance from said outlet to insure impingement thereon of substantially all particulate matter entrained in the gas stream passing from said nozzle outlet after expansion of the gasstream in said chamber reducing the gas velocity;

means for removing particulate matter from the expansion zone; and means for removing the clarified gas from the upper portion of the expansion zone.

11. The apparatus of claim 10 wherein said entry has an effective cross-sectional area of about 3 to 5 times the effective cross-sectional area of said outlet.

12. The apparatus of claim 10 wherein said mean angle of convergence is about 5.5° to 6.5°.

13. The apparatus of claim 10 having a liquid spray means in said gas stream ahead of said nozzle entry and directed toward said nozzle entry.

14. The apparatus of claim 10 wherein said means for removing the clarified gas stream from the expansion zone comprises a de-misting means.

15. The apparatus of claim 10 wherein said nozzle outlet has a diameter about 0.5 to 0.7 times the distance from the nozzle outlet to the impingement means.

* * * * *